United States Patent
Kunito et al.

(10) Patent No.: US 6,549,537 B2
(45) Date of Patent: *Apr. 15, 2003

(54) COMMUNICATION SYSTEM AND METHOD

(75) Inventors: Yoshiyuki Kunito, Kanagawa (JP); Takao Terao, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,027

(22) Filed: May 11, 1998

(65) Prior Publication Data
US 2002/0057695 A1 May 16, 2002

(30) Foreign Application Priority Data
May 15, 1997 (JP) .............................. 9-125929

(51) Int. Cl.[7] .............................................. H04L 12/56
(52) U.S. Cl. .................................. 370/395.42; 370/412
(58) Field of Search ........................ 370/395, 352–353, 370/354, 396, 414, 233, 395.52, 395.53, 395.54, 395.1, 412, 395.42

(56) References Cited

U.S. PATENT DOCUMENTS

| | | | | |
|---|---|---|---|---|
| 5,173,901 A | * | 12/1992 | DeSomer | 370/396 |
| 5,204,857 A | * | 4/1993 | Obara | 370/354 |
| 5,392,280 A | * | 2/1995 | Zheng | 370/353 |
| 5,570,355 A | * | 10/1996 | Dail et al. | 370/352 |
| 5,768,273 A | * | 6/1998 | Aznar et al. | |

* cited by examiner

*Primary Examiner*—Melvin Marcelo
*Assistant Examiner*—Inder Palmehra
(74) *Attorney, Agent, or Firm*—Frommer Lawrence & Haug LLP; William S. Frommer; Bruno Polito

(57) ABSTRACT

A communication system is disclosed which can transmit a real-time cell and a nonreal-time cell with no jitters caused in the real-time cell. When a real-time cell and nonreal-time cell are outputted at a same timing, a priority control circuit (40) passes the output timing of nonreal-time ATM cell once and sets in a flag memory (40a) a wait flag indicating that the nonreal-time cell output timing has been passed once. Also, when there is no real-time ATM cell, the priority control circuit (40) judges whether a wait flag is set in the flag memory (40a), and allows to output one nonreal-time ATM cell when a flag is set.

4 Claims, 7 Drawing Sheets

COMMUNICATION SYSTEM AND METHOD

BACKGROUND OF THE INVENTION

1. Field of the Invention

The present invention relates to a communication system and a method for transmission and reception of a plurality of data different in quality of communication from each other including real-time data and nonreal-time data.

2. Description of Related Art

The ATM (Asynchronous Transfer Mode) communication system can provide an asynchronous communication, transmit data at a transfer rate covering a wide range from several tens Megabits per second (Mbps) to Gigabits per second (Gbps), and meets the requirements for a next-generation LAN (Local Area Network).

FIG. 1 shows an ATM terminal adopting an ATM communication of this type. As shown, the ATM terminal comprises a CPU (Central Processing Unit) 101, a memory 102 in which data to be transmitted are stored, a dual-port RAM 104, circuits 105, 108 and 111 to generate cells, circuits 106, 109 and 112 to add a header to each cell, traffic shaver circuits 107, 110 and 113, and an arbiter circuit 114.

The CPU 101 reads data from the memory 102 via a CPU bus 103, and transfers it to the dual-port RAM 104 which will supply three data to the cell generation circuits 105, 108 and 111, respectively, which will generate cells based on a size of PDU (Protocol Data Unit). The cells are supplied to the head add circuits 106, 109 and 112 which will add headers to the supplied cells, respectively, to generate ATM cells for delivery to the traffic shaver circuits 107, 110 and 113, respectively. In the traffic shaver circuits 107, 110 and 113, the supplied cells are subjected to a traffic shaving to adjust the ATM transfer rate to supply the cells to the arbiter circuit 114. The arbiter circuit 114 supplies the cells from the traffic shaver circuits 107, 110 and 113 to physical layers (not illustrated), respectively while re-arranging, by buffering, cells supplied at a same timing and also supplying them to the physical layers. More specifically, the arbiter circuit 114 arbitrates all connections in a same manner without discrimination of the quality of transmitted data, for example, whether they are real-time data or nonreal-time data.

The above ATM terminal is featured by maintaining a real-time occurrence of a data communication, namely, a necessary bandwidth for the communication. However, when supplied with ATM cells from the traffic shaver circuits 107, 110 and 113, respectively, at a same timing, the arbiter circuit 114 has to provide an arbitration to buffer one of the ATM cells. Therefore, jitters take place in the ATM cells. As shown in FIG. 2, for example, when real-time ATM cells are supplied more early than nonreal-time ATM cells, the arbiter circuit 114 will output the real-time ATM cells more early. On the other hand, when nonreal-time ATM cells are continuously supplied more early than real-time ATM cells, the arbiter circuit 114 will output the real-time ATM cells after outputting the nonreal-time ATM cells. In this case, however, the longer the continuation of the nonreal-time ATM cells, larger cumulated jitters will take place in the real-time ATM cells, which will impair the real-time occurrence of a data communication.

SUMMARY OF THE INVENTION

The present invention has an object to overcome the above-mentioned drawbacks of the prior art by providing a communication system and a method for transmission of real-time and nonreal-time cells without any jitters caused in the real-time cells.

The above object can be accomplished by providing a communication system for outputting a first data to be real-time transmitted and a second data to be nonreal-time transmitted, comprising, according to the present invention, means for generating synchronous cells to output the first data synchronously with the communication system, means for generating asynchronous cells to output the second data, means for selecting either the synchronous or asynchronous cells, and means for controlling the selecting means to preferentially output either the synchronous or asynchronous cells.

According to another aspect of the present invention as set forth in claim 2, the controlling means controls the selecting means to preferentially output the synchronous cells.

Therefore, when synchronous cells are generated, the communication system according to the present invention will preferentially output the synchronous cells rather than asynchronous cells.

BRIEF DESCRIPTION OF THE DRAWINGS

These objects and other objects, features and advantages of the present intention will become more apparent from the following detailed description of the preferred embodiment of the present invention when taken in conjunction with the accompanying drawings, of which.

DETAILED DESCRIPTION OF THE PREFERRED EMBODIMENTS

Figure 1:
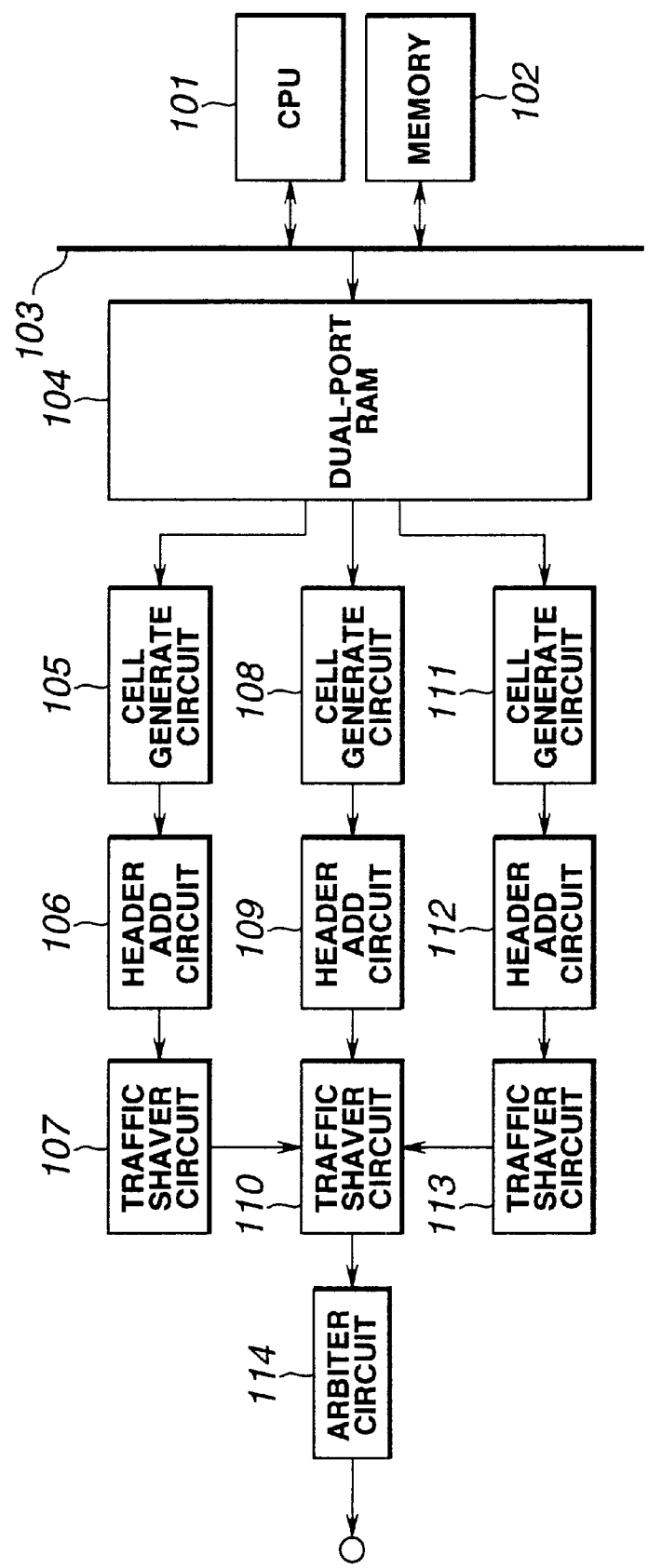
FIG. 1 is a block diagram showing the configuration of an embodiment of the ATM terminal invention.
Figure 2:
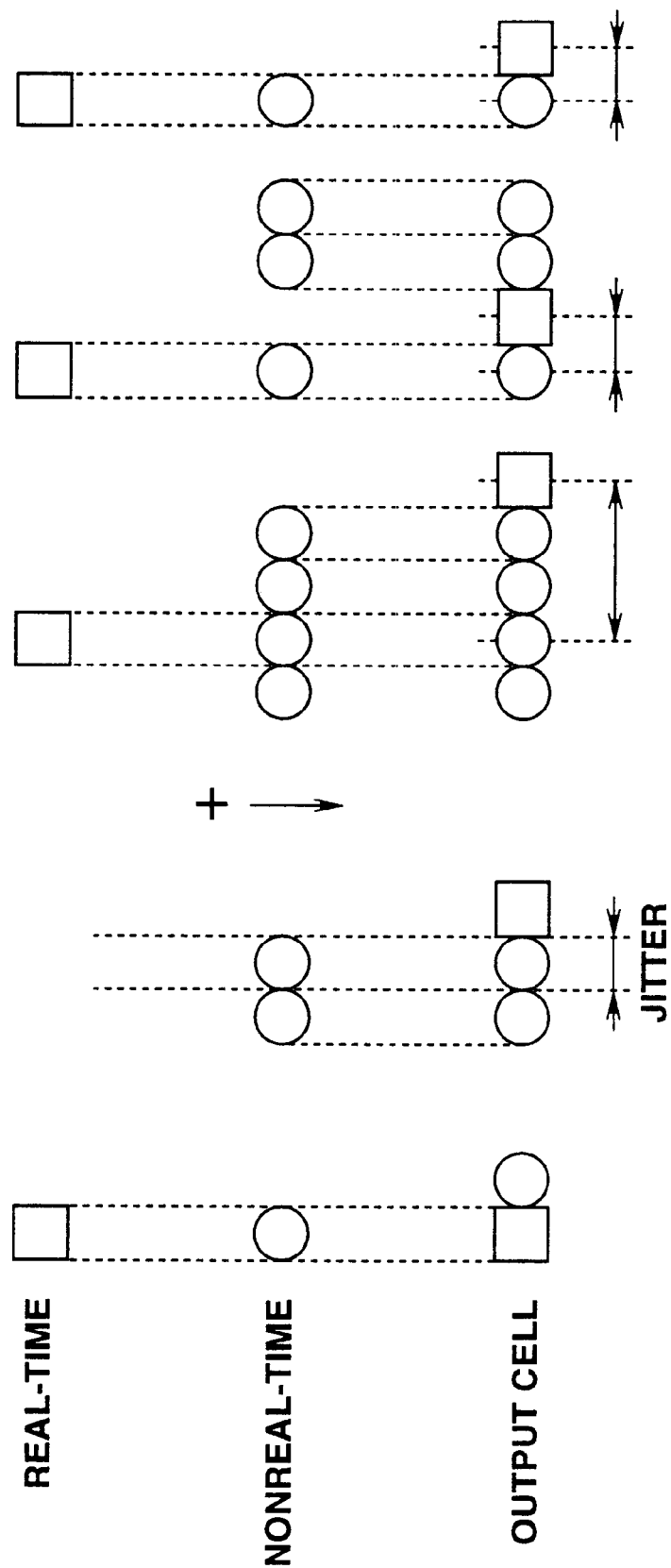
FIG. 2 is a timing chart under which an SAR circuit of the ATM terminal outputs synchronous and asynchronous cells.
Figure 3:
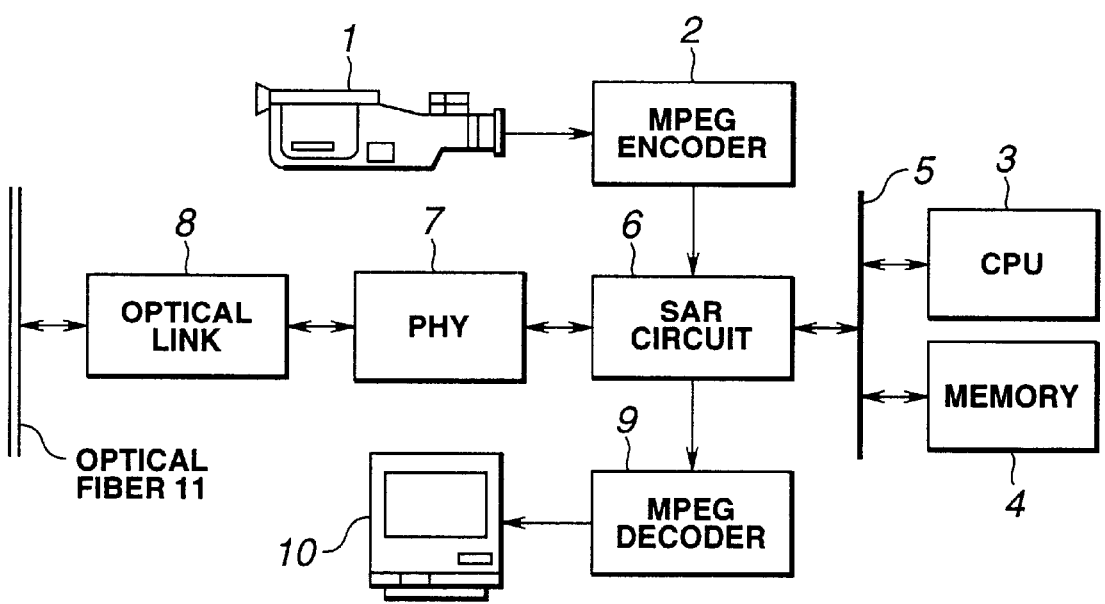
FIG. 3 is a schematic block diagram of the configuration of another embodiment of the ATM terminal.

The communication system according to the present invention is applicable to an ATM (Asynchronous Transfer Mode) terminal adapted to transmit a real-time image data picked up by a camera 1 and a nonreal-time image data read out of a memory 4 as shown in FIG. 3, and to receive a data from an optical fiber.

In the ATM terminal, the image data picked up by the camera 1 is encoded by an MPEG (Motion Picture Experts Group) encoder 2 and supplied to an SAR (Segmentation and Reassemble) circuit 6. Also, the image data read from the memory 4 by a CPU (Central Processing Unit) circuit 3 is supplied via a CPU bus 5 to the SAR circuit 6.

The SAR circuit 6 is adapted to process the real-time image data from the camera 1 and the nonreal-time image data separately and independently of each other, and generate cells of the respective image data for delivery to a physical layer 7. The physical layer 7 provides a signal processing depending upon a certain physical layer and supplies it via an optical link 8 to an optical fiber 11. Thus, the ATM cells are transmitted through the optical fiber 11 to another ATM terminal via an ATM exchange (not illustrated).

On the other hand, the SAR circuit 6 is supplied with ATM cells coming from the other ATM terminal via the optical fiber 11, optical link 8 and physical layer 7. The SAR circuit 6 will remove address information, etc. of the ATM cells, and then reassemble the remaining data to restore an original data row.

Figure 4:
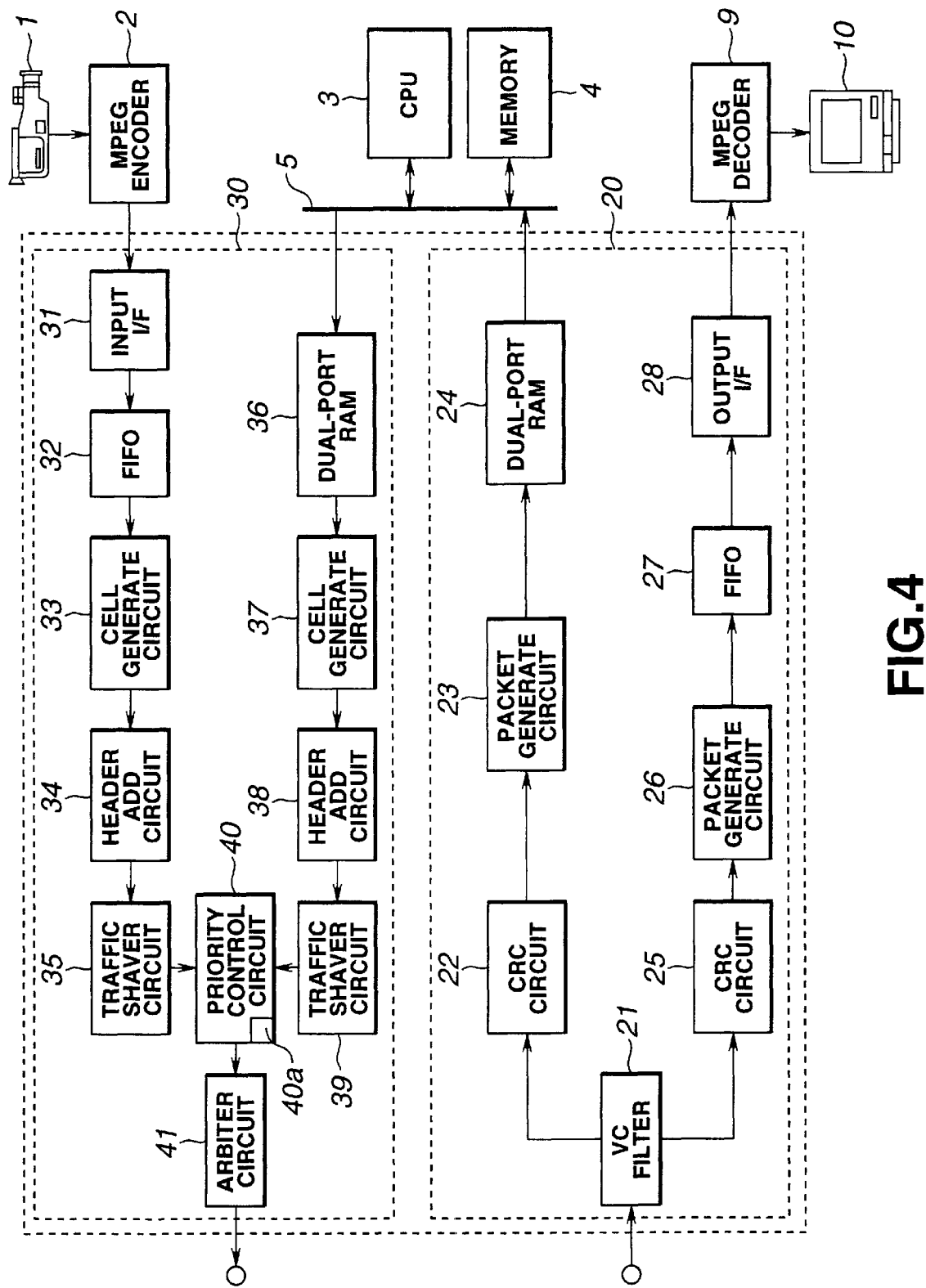
FIG. 4 is a block diagram showing in detail the configuration of an SAR circuit.

As seen from FIG. 4, the SAR circuit 6 comprises a receiver 20 to receive ATM cells from another ATM terminal, and a transmitter 30 to generate and transmit ATM cells from the image data.

The receiver 20 comprises a VC (Virtual Circuit) filter 21 to discriminate ATM cells, a CRC (Cyclic Redundancy Check) circuit 22 to correct errors, a packet generation circuit 23, a dual-port RAM 24, a CRC circuit 25, a packet generation circuit 26, a buffering FIFO (First-In First-Out) memory 27, and an output interface 28 (will be referred to as "I/F" hereafter).

The VC filter 21 separates ATM cells from the physical layer 7 into real-time and nonreal time ones based on a VPI (Virtual Path Identifier)/VCI (Virtual Channel Identifier) which will be described later, and supplies the nonreal-time ATM cells to the CRC circuit 22 and the real-time ATM cells to the CRC circuit 25. Since the ATM communication is such that a communication channel is secured at the time of call setting, the CPU 3 can set a VPI/VCI value for discrimination based on the information for the call setting.

In the nonreal-time system, the CRC circuit 22 effects CRC of the ATM cells. If any of the ATM cells is found to have an error, it is discarded as necessary. Those of the ATM cells having no error are supplied to the packet generation circuit 23 which will assemble the ATM cells in PDU (Protocol Data Unit) units and supply them to the dual-port RAM 24. When the CPU 3 recognizes, from an interrupt signal, that the ATM cells in the PDU units have been stored into the dual-port RAM 24, it transfers the data in the dual-port RAM 24 to the memory 4.

On the other hand, in the real-time system, the CRC circuit 25 supplies the CRC-checked ATM cells to the FIFO memory 27 via the packet generation circuit 26. The FIFO memory 27 buffers the ATM cells and supplies them to an MPEG decoder 9 via the output I/F 28. The MPEG decoder 9 will decode and supply an NTSC image signal to a monitor 10 which will thus display an image reproduced from real-time ATM cell data.

The transmitter 30 comprises an input I/F 31, a buffering FIFO memory 32, a cell generation circuit 33, a header addition circuit 34, a traffic shaver circuit 35, a dual-port RAM 36, a cell generation circuit 37, a header addition circuit 38, a traffic shaver circuit 39, a priority control circuit 39 to preferentially output real-time cell, and an arbiter circuit 41 to output ATM cells under the control of the priority control circuit 40.

Figures 5A, 5B, 5C, 5D, 5E:
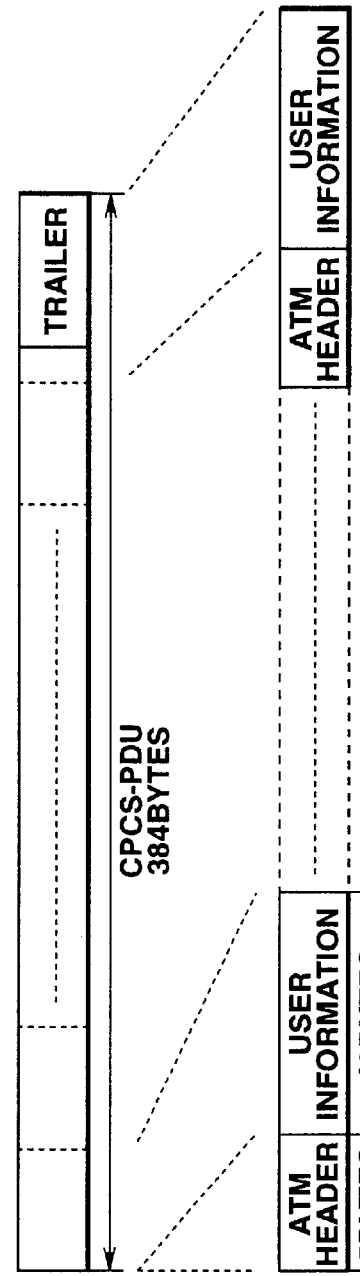
FIGS. 5A to 5D are data configuration diagrams for explanation of the relation between a transport stream and an ATM cell.

The input I/F 31 is supplied with a transport stream (MPEG2 TS) (as in FIG. 5A) generated through encoding by the MPEG encoder 2. The input I/F 31 discriminates the header of the transport stream, and supplies it to the cell generation circuit 33 via the FIFO memory 32. Each time the cell generation circuit 33 is supplied with two such transport streams, it will segment them into eight cells each of 48 bytes as shown in FIG. 5C and add CRC-32 (cyclic redundancy code) to a trailer shown in FIG. 5B to indicate that the frame is normal, and supply the cells to the header addition circuit 34. The header addition circuit 34 adds a header of 5 bytes to each cell of 84 bytes to generate an ATM cell of 53 bytes and supplies the cells to the traffic shaver circuit 35 as shown in FIG. 5D.

In the header of ATM cell shown in FIG. 5E, GFC stands for General Flow Control used to prevent ATM cells delivered from various terminals from conflicting with each other so that a transmission line can evenly be shared by the terminals. VPI stands for Virtual Path Identifier to judge which one of virtual paths is to be used. VCI stands for Virtual Channel Identifier to determine which one of virtual channels multiplexed in the virtual path thus determined is to be used for data transmission to a destination. PT stands for PayLoad Type to indicate of which an information in the user information of 48 bytes in the ATM cell is of, user information cell, maintenance/run cell or resource management cell. CLP stands for Cell Loss Priority used, when the traffic overflows in a network, to provide such a traffic control that cells of lower importance are preferentially discarded and only important cells are transmitted. HEC standard for Header Error Control which is of 1 byte and provides cyclic redundancy check for an error in a preceding header information of 4 bytes.

The ATM cell is supplied to the traffic shaver circuit 35 in which it will be traffic-shaved and supplied to the priority control circuit 40.

On the other hand, in the nonreal-time system, the CPU 3 reads data out of the memory 4 and stores it into the dual-port RAM 36 via the CPU bus 5. The traffic shaver circuit 39 is supplied with the ATM cell of 53 bytes through the cell generation circuit 37 and header addition circuit 38. The traffic shaver circuit 39 will set an ATM cell output interval based on a predetermined cell output interval signal and supply it to the priority control circuit 40.

Thus, the priority control circuit 40 is supplied with a real-time ATM cell from the traffic shaver circuit 35 and nonreal-time ATM cell from the traffic shaver circuit 39. The priority control circuit 40 controls the arbiter circuit 41 to for preferential output of real-time ATM cells at every time, thereby maintaining the real-time occurrence of the data communication.

Figure 6:
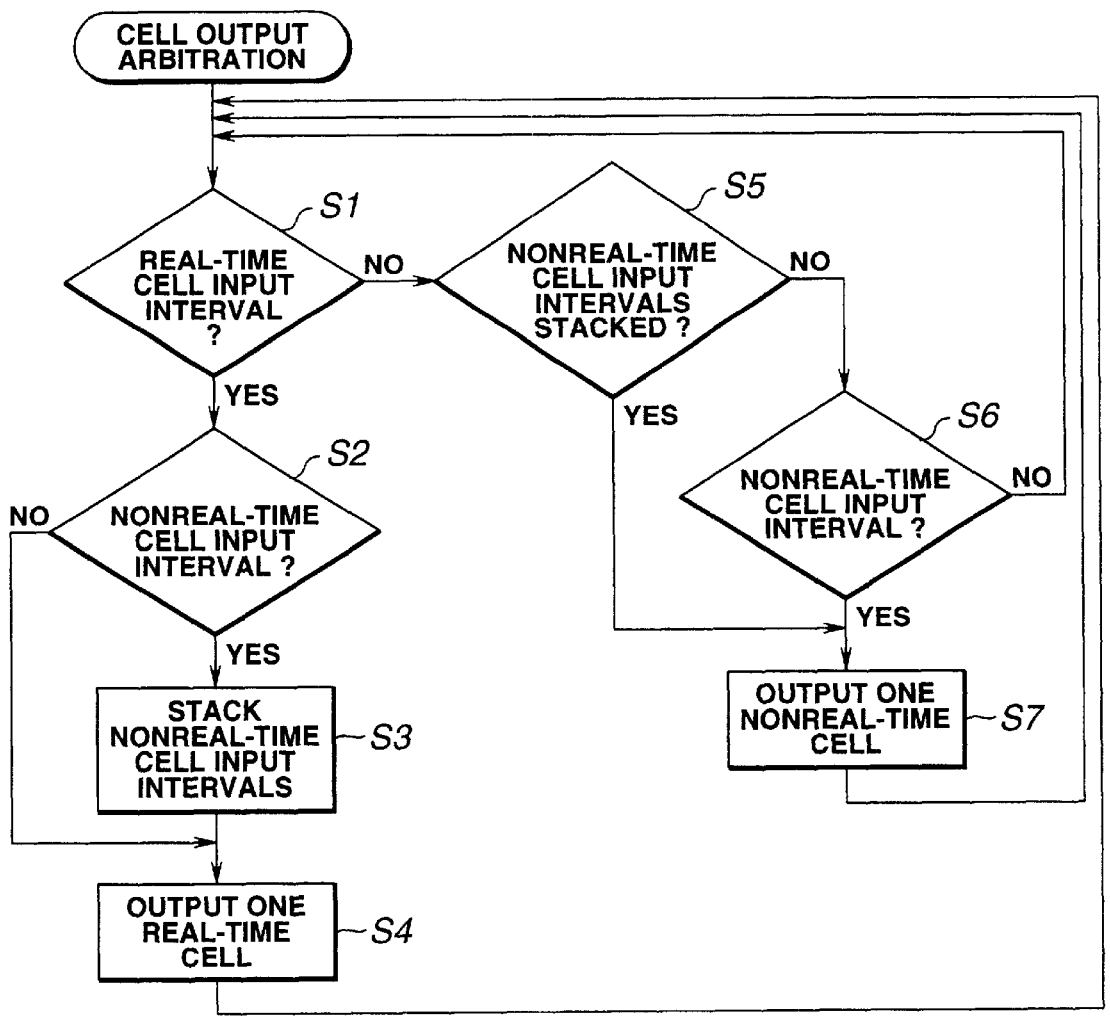
FIG. 6 is a functional flow chart of the SAR circuit.

More specifically, the priority control circuit 40 judges whether an ATM cell output interval is a real-time one, at Step S1 as shown in FIG. 6. In other words, the priority circuit 40 judges whether a real-time ATM cell has been supplied from the traffic shaver circuit 35. When a real-time ATM cell has been supplied from the traffic shaver circuit 39, the operation goes to Step S2. If not, the operation goes to Step S5.

At Step S2, the priority control circuit 40 judges whether an ATM cell output interval is a nonreal-time one. In other words, the priority control circuit 40 judges whether a nonreal-time ATM cell has been supplied, the operation goes to Step S3. If not, the operation goes to Step S4.

At Step S3, the priority control circuit 40 stacks nonreal-time intervals at a predetermined location of a memory 40a. That is to say, when real-time and nonreal-time cells are outputted at a same timing, the priority control circuit 40 will pass the output timing of nonreal-time ATM cell once and sets a wait flag indicative of the one pass at the predetermined location of the memory 40a. In this case, the operation goes to Step S4.

At Step S4, the priority control circuit 40 controls the arbiter circuit 41 to output one real-time ATM cell, and the operation returns to Step S1. Therefore, the real-time ATM cell is outputted without no degradation of the real-time occurrence of the data communication.

On the other hand, when it has been judged at Step S1 that the ATM cell output interval is not any real-time one, the priority control circuit 40 will judges at Step S5 whether nonreal-time ATM cell output intervals have been stacked. In other words, the priority control circuit 40 will judge whether a wait flag is set in the flag memory 40a. If any, the operation goes to Step S7. If not, the operation goes to Step S6.

At Step S6, the priority control circuit 40 judges whether the ATM cell output interval is a nonreal-time one. When the ATM cell output interval is a nonreal-time one, the operation goes to Step S7. If no, the operation goes back to Step S1.

At Step S7, the priority control circuit 40 will output one nonreal-time ATM cell. The operation returns to Step S1.

The header addition circuit 34, traffic shaver circuit 35, etc. incorporated in the real-time system and the head addition circuit 38, traffic shaver circuit 39, etc. included in the nonreal-time system are physically independent of each other, respectively. The priority control circuit 40 judges the interval of ATM cell output from such independent hardware for output of either real-time or nonreal-time ATM cell.

Figure 7:
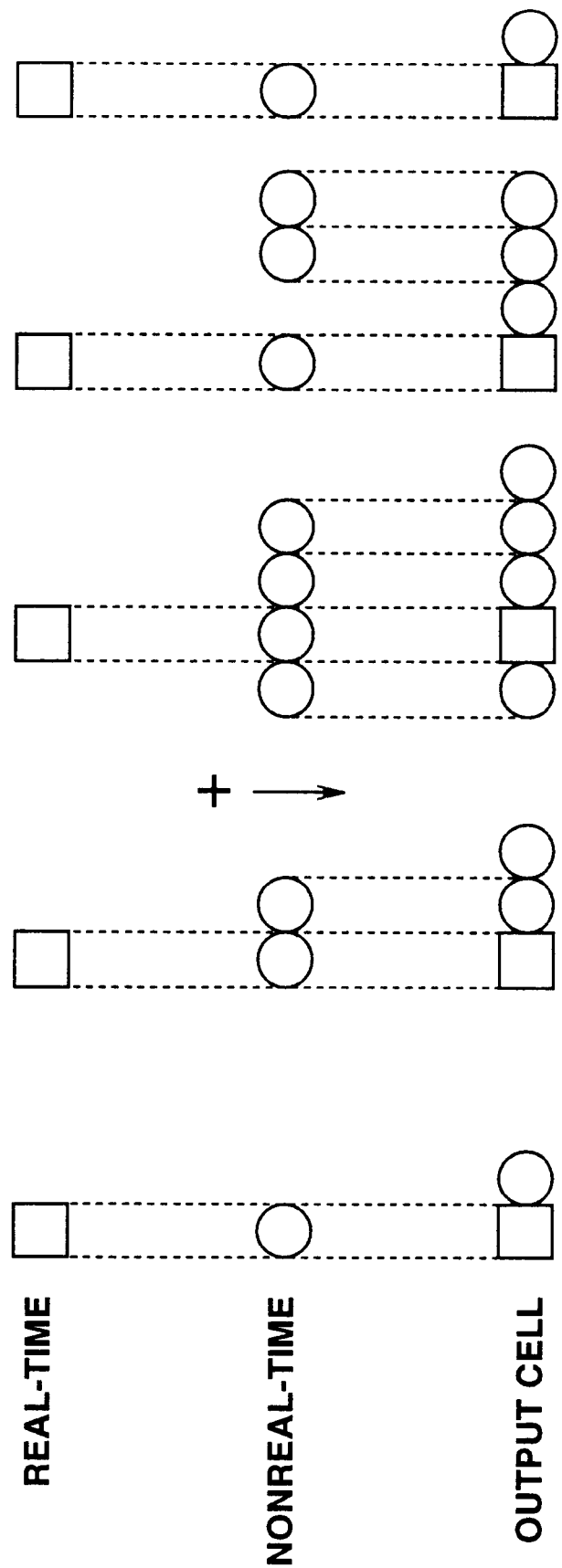
FIG. 7 is a functional timing chart of the SAR circuit for output of synchronous and asynchronous cells.

As having been described in the foregoing, the communication system according to the present invention outputs a real-time ATM cell, if any, for each cell and a nonreal-time ATM cell when no real-time ATM cell exists, thereby permitting to maintain the real-time occurrence of data communication without any jitters in the real-time ATM cells as shown in FIG. 7. That is to say, even while nonreal-time ATM cells are being continuously outputted, a real-time ATM cell, if any, is outputted to prevent jitters from taking place in the ATM cell as shown in FIG. 7.

Note that the present invention is not limited to the embodiment having been described in the foregoing but can of course be modified in design without departing from the scope of technical concept disclosed in the claims.

For example, multiple real-time and nonreal-time ATM cell output ports may be provided. In this case, a priority of ATM cell output in the real-time system and also that in the nonreal-time system have only to be set.

In the aforementioned embodiment, it is judged for each cell whether the cell is from the real-time or nonreal-time system. However, this judgment may be done for every few cells.

As having been described in the foregoing, the communication system according to the present invention controls the selecting means to preferentially output synchronous cells, thereby permitting to transmit synchronous cell data without occurrence of jitters in the synchronous cells and maintain the real-time communication of the cell data.

What is claimed is:

1. A communication system for outputting a first data to be real-time transmitted and a second data to be nonreal-time transmitted, comprising:

means for generating a real-time Asynchronous Transfer Mode (ATM) cell for outputting the first data;

means for generating a nonreal-time ATM cell for outputting the second data;

selecting means for selecting either the real-time or nonreal-time ATM cell as a preferential cell;

controlling means for controlling the selecting means to select the real-time ATM cell as the preferential cell;

nonreal-time ATM cell stacking means for stacking nonreal-time ATM cell data in a memory; and flag storing means for storing a flag indicating that the nonreal-time ATM cells are stacked in said memory;

wherein said controlling means is adapted to have the nonreal-time ATM cell stacking means stack the nonreal-time ATM cells in said memory and to have the flag storing means store the flag in said flag storing means when a real-time ATM cell output timing is generally the same as a nonreal-time ATM cell output timing; and wherein the controlling means is adapted to check, at a time other than the output time of a real-time ATM cell, if a flag is stored in the flag storing means and wherein said controlling means controls said selecting means to output a nonreal-time ATM cell stacked in said memory when a flag is judged to be stored in the flag storing means.

2. The communication system set forth in claim 1, wherein the controlling means deletes the flag from the flag storing means when said memory for stacking said nonreal-time ATM cells is empty.

3. A communication method for outputting a first data to be real-time transmitted and a second data to be nonreal-time transmitted, comprising the steps of:

generating a real-time Asynchronous Transfer Mode (ATM) cell for outputting the first data;

generating a nonreal-time ATM cell for outputting the second data;

selecting via a selecting means either the real-time or nonreal-time ATM cell as a preferential cell;

controlling the selecting means through a controlling means to output the real-time ATM cell as said preferential cell;

when a real-time ATM cell output timing is generally the same as a nonreal-time ATM cell output timing, stacking nonreal-time ATM cell data in a memory and storing a flag indicating that the nonreal-time ATM cells are stacked in said memory; and checking, at a time other than the output time of a real-time ATM cell, if said step of storing a flag has been executed, and when said step of storing a flag has been executed, outputting a nonreal-time ATM cell stacked in said memory.

4. The communication method set forth in claim 3, further comprising the step of deleting a flag stored according to said storing step when said memory for stacking said nonreal-time ATM cells is empty.

* * * * *